May 27, 1924.

F. C. ROBERTS

AUTOMOBILE SIGNAL EXHIBITOR

Filed July 29, 1921   2 Sheets-Sheet 1

1,495,204

Inventor
Ferdinand C. Roberts

May 27, 1924.

F. C. ROBERTS 1,495,204

AUTOMOBILE SIGNAL EXHIBITOR

Filed July 29, 1921   2 Sheets-Sheet 2

Inventor
Ferdinand C. Roberts
By
Attorneys

Patented May 27, 1924.

1,495,204

UNITED STATES PATENT OFFICE.

FERDINAND C. ROBERTS, OF DETROIT, MICHIGAN.

AUTOMOBILE SIGNAL EXHIBITOR.

Application filed July 29, 1921. Serial No. 488,306.

*To all whom it may concern:*

Be it known that I, FERDINAND C. ROBERTS, a citizen of the United States of America, residing at Detroit, in the county of Wayne and State of Michigan, have invented certain new and useful Improvements in Automobile Signal Exhibitors, of which the following is a specification, reference being had therein to the accompanying drawings.

This invention relates to an automobile signal exhibitor and has special reference to that class of signals which are electrically operated and controlled, and located on the rear end of an automobile or similar vehicle, preferably in proximity to the license card or sign so that such card or sign may be illuminated from the signal exhibitor.

The primary object of my invention is to combine tail and signal lamp exhibitors into a single structure that will present a neat and attractive appearance and may be readily mounted on the rear end of an automobile, truck or other vehicle so that rays of light from either the signal lamp or the tail lamp may be utilized for illuminating the license card or sign of the vehicle.

Another object of this invention is to provide a signal exhibitor containing two lamps, both or either of which may be used for signalling purposes, one of said lamps being more powerful than the other to illuminate a sign providing with the word "Stop" or some other indicia by which a following automobile can ascertain that the signal carrying automobile is about to stop, slow up, or enter a different lane of travel, thus reducing to a minimum the probabilities of a rear end collision.

A further object of my invention is to provide a combined signal and tail lamp exhibitor and furnish the same with a novel socket switch, which may be adjusted to permit of both lamps of the signal exhibitor being used or one of the lamps cut out of the signal circuit; it being my intention to provide a signal which will conform to the traffic requirements of various States, or cities and may be adjusted to conform to others.

A still further object of this invention is to provide a signal exhibitor wherein the parts are constructed with a view of reducing the cost of manufacture and at the same time retain those features by which accessibility and ease of assembling are secured.

With such ends in view, my invention resides in the construction to be hereinafter described and then claimed, and reference will now be had to the drawings, wherein—

Figure 1:
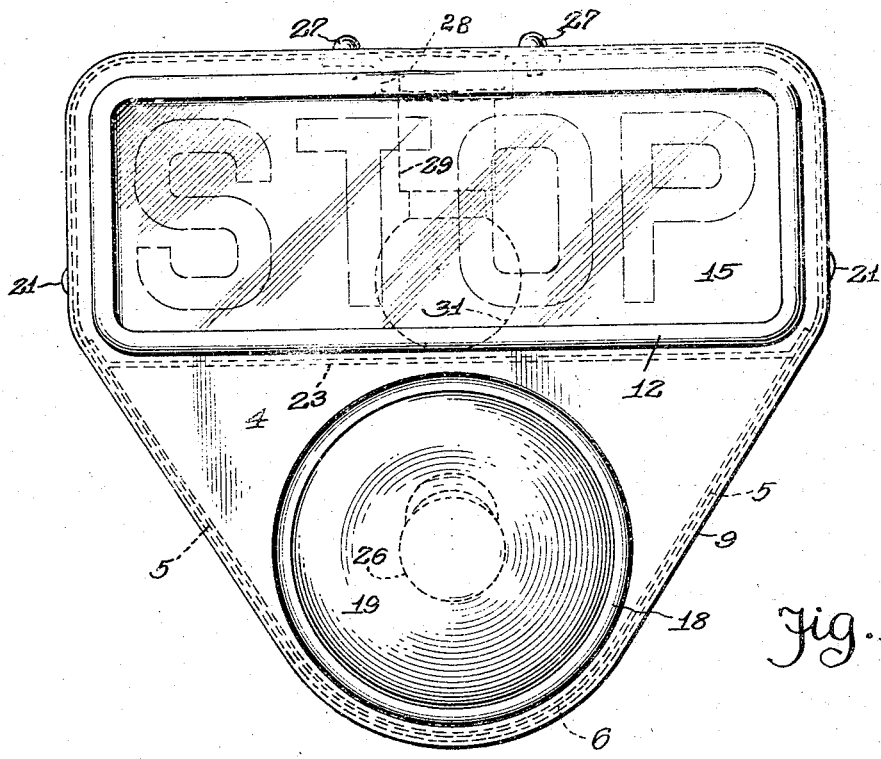
Figure 1 is a front elevation of the signal exhibitor.
Figure 2:
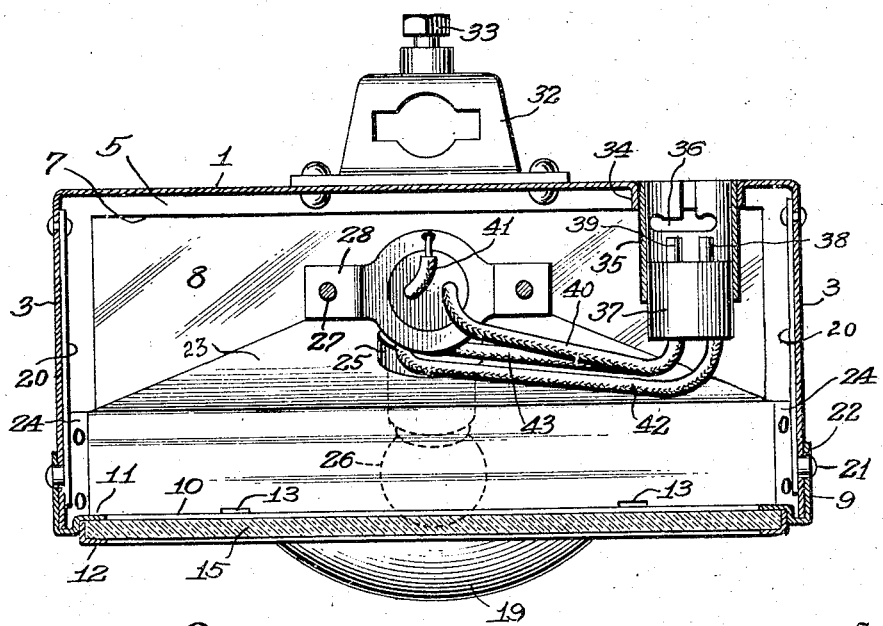
Fig. 2 is a horizontal sectional view of the same.
Figure 3:
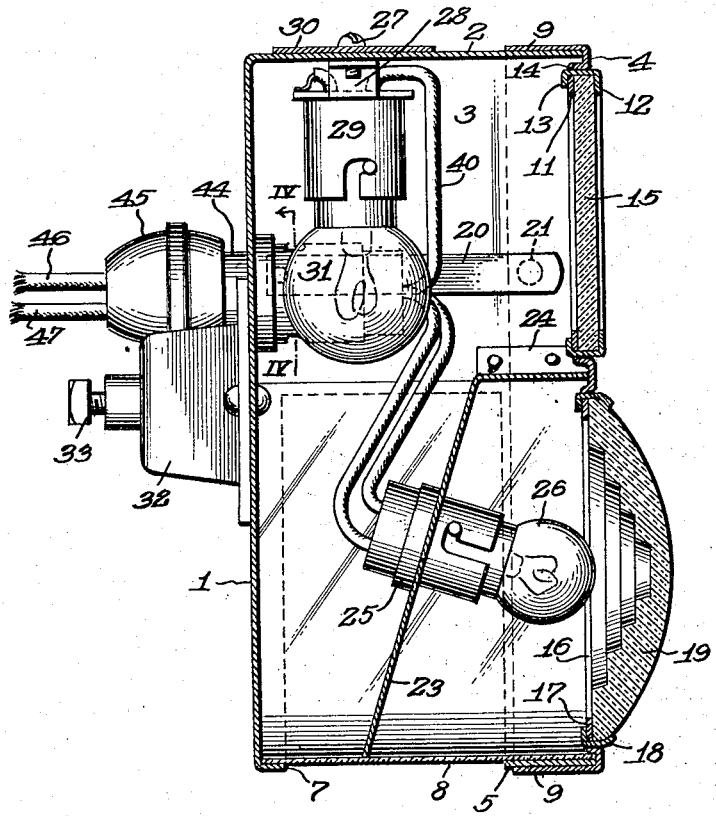
Fig. 3 is a vertical longitudinal sectional view of the exhibitor.

The signal exhibitor comprises a metallic casing having a rear wall 1, a top wall 2, side walls 3, a front wall 4 and converging bottom walls 5, said bottom walls converging inwardly from the lower ends of the side walls 3 and cooperating with the rear wall 1 and the front wall 4 in providing a bottom compartment in the casing which tapers to a rounded bottom portion 6. The converging walls 5 may be a continuation of the side walls 3 and said bottom walls and the rounded bottom portion 6 have a large opening 7 which is preferably closed by a piece of celluloid 8 or other transparent material mounted against the walls 5 within the casing, said piece of transparent material excluding dust and dirt but permitting rays of light to pass therethrough, from within the casing, so that such emitted light may be utilized for illuminating a license card, sign or other device contiguous to the casing.

The upper portion of the casing provides a substantially rectangular compartment communicating with the tapering or triangular shaped lower compartment of the casing and in order that easy access may be had to these casing compartments the front wall 4 is made detachable and provided with a marginal flange 9 permitting of the wall 4 being fitted on the front edges of the casing. The upper portion of the wall has an oblong opening 10 and the material bordering upon said opening is pressed inwardly to provide a seat 11 for an oblong frame 12, said frame having a plurality of lugs 13 extending through openings 14 of the seat 11 and clenched on the seat, so as to hold the frame 12 positively in engagement with the detachable front wall 4 of the casing.

In the frame 12 is a transparent plate 15, preferably made of red colored glass and the glass plate is painted or otherwise rendered opaque in portions so as to leave transparent portions representing the characters of the word "Stop" or some other indicia. The red characters will be illuminated from within the casing and will present a sign that may be easily read and distinguished at a distance. Of course any other form of sign or stencil may be mounted in the frame 12 and since said frame is detachable it is possible to provide the exhibitor with a sign that will conform to a traffic requirement.

The lower portion of the wall 4 has a circular opening 16 provided with a seat 17 for a lens frame 18 having a conventional form of bulls'-eye lens 19. The frame 18 of the lens is mounted in the seat 17 similar to the frame 12 of the transparent plate 15, and the lens 19 is preferably red in color, but may be green or any other color. It is primarily intended as a tail signal to indicate danger to an approaching vehicle.

Detachably holding the front wall 4 in engagement with the casing are resilient arms 20 disposed against the inner faces of the walls 3 with the inner ends thereof attached to said walls adjacent the rear wall 1. The outer ends of the arms 20 are provided with pins 21 adapted to extend through openings in the walls 3 and enter openings 22 in the flanges 9. By pressing on the pins 21 the front wall 4 may be removed from the casing.

In the lower tapering compartment of the casing is mounted an inclined reflector or partition 23 which has side flanges 24 riveted or otherwise connected to the walls 5, adjacent the walls 3. The upper portion of the partition 23 is horizontally disposed and said partition has a central socket 25 for a detachable incandescent lamp 26, which may be connected to the socket 25 by removing the front wall 4 of the casing. Lamp 26 is in proximity to the lens 19 and will cast rays of light through the lens to illuminate the same. Rays of light from this lamp may be also projected through the transparent material 8, or bottom wall of the casing, at the front side of the partition 23.

Connected to the top wall 2 by screws 27 or other fastening means is a hanger 28 for a lamp socket 29, and the same screws may be employed for holding a name plate 30 on the casing. Detachably connected to the socket 29 is an incandescent lamp 31, preferably larger than the lamp 26, and adapted to cast rays of light through the transparent portions of the sign 15.

The outer face of the rear wall 1 has a socket 32 provided with a set screw 33 so that the exhibitor casing may be mounted on and attached to a suitable vehicle bracket (not shown).

The rear wall 1 of the casing has an inwardly projecting sleeve or support 34 provided with a sleeve-like socket 35 and said socket has the closed walls thereof provided with bayonet slots 36. Mounted in the inner end of the socket 35 is a plug 37 having contact posts 38 and 39. One of the contact posts is connected by a conductor 40 to the lamp socket 29 and said lamp socket has another conductor 41 grounded or connected to the casing or some part thereof. The other contact post is connected by a conductor 42 to the lamp socket 25 and said lamp socket is connected by another conductor 43 to the conductor 40 or to the contact post to which said conductor is connected.

Figure 4:
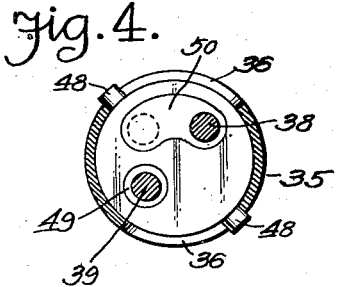
Fig. 4 is a cross sectional view taken on the line IV—IV of Fig. 3, looking in the direction of the arrow, showing the socket switch set for the use of both lamps of the exhibitor.

Detachably mounted in the sleeve socket 35 is a socket plug 44 having a suitable insulator 45 and leading-out wires 46 and 47. On the sides of the plug 44 are pins 48 adapted to engage in the bayonet slots 36 of the sleeve socket 35 and adjustably hold the plug for circuits including the lamps 26 and 31, or the lamp 31 alone. The leading-out wires 46 and 47 are electrically connected to contact members 49 and 50 of the plug, the contact member 50 being segment shaped so as to constantly engage one of the contact posts 38, and the contact member 49 engages the other contact post when the plug is shifted from the position shown in Fig. 5 to the position shown in Fig. 4.

Figure 7:
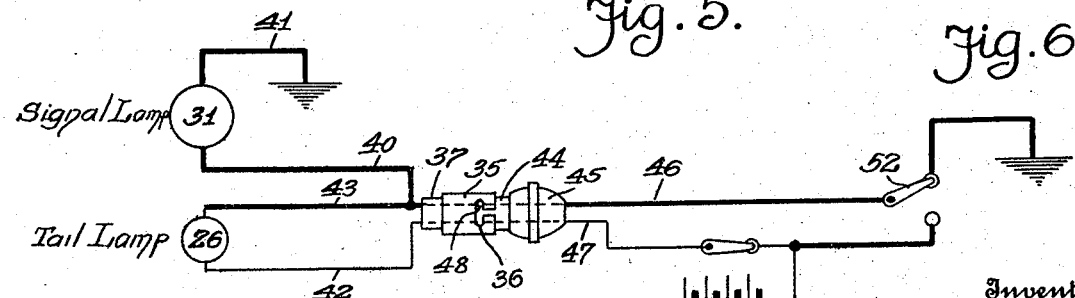
Fig. 7 is a diagrammatic view of the electrical connections for the signal exhibitor.

Reference will now be had to Fig. 7 showing the wiring diagram for installing the signal exhibitor, and a great many automobiles now in use include a source of electrical energy, as battery cells 51, the incandescent tail lamp 26, an ordinary plug and socket, a switch and sufficient wiring to establish a circuit between the lamp 26 and the battery cells 51, so that when the switch is closed the tail lamp will be in operation. Instead of connecting the conductor 43 to the plug 44 the conductor was grounded and a portion of the conventional wiring has been indicated by light lines, while the additional wiring which I incorporate is shown by heavy lines. Assuming that the plug 44 is in the position shown in Fig. 4 there will be two circuits, one for the tail lamp 26 and one for the signal lamp 31. The switch for the tail light circuit is closed so that the tail lamp will constantly burn and illuminate the lens 19 to provide a danger signal, and a switch 52 is provided for the signal lamp circuit so that the lamp may be illuminated at will.

Figure 5:
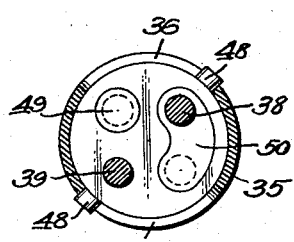
Fig. 5 is a similar view showing the socket switch set for the use of one lamp.
Figure 6:
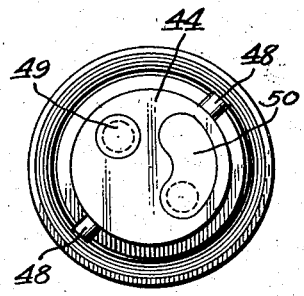
Fig. 6 is an end view of the disconnected plug portion of the socket switch.

When it is desired to use the signal lamp alone, the plug 44 may be turned to the position shown in Fig. 5, thus disconnecting the tail lamp relative to the source of energy.

The tail lamp installation may remain on an automobile so that should the automobile enter a State or city where ordinances or the law requires a tail lamp, then the plug 44 may be adjusted to permit of the tail lamp being used. The plug 44 therefore serves somewhat as a rotary switch with its action limited by the pins 48 engaging in the slots 36, and in either position of the plug it cannot become accidentally displaced, but will require a manual operation to be detached.

When the tail lamp is not in use the signal lamp may be depended upon to illuminate any license card or sign below the exhibitor casing, since rays of light from the signal lamp may be projected downwardly behind the partition 23 and through the transparent bottom wall of the exhibitor casing.

The exhibitor is susceptible to any desired finish may be supported on any part of an automobile, truck or other vehicle, and such changes, as are permissible by the appended claims may be resorted to without departing from the spirit of the invention.

What I claim is:—

A signal exhibitor comprising a casing having an upper rectangular compartment, and a lower adjoining triangular compartment, said lower triangular compartment having a transparent wall extending from one side wall of said upper compartment to the other side wall thereof and forming the side and bottom walls of said triangular compartment, a lamp in each compartment adapted to cast rays of light through said transparent wall, the lamp arrangement being such that the lamp of the lower compartment has a greater degree of light dispersion through said transparent wall than the lamp of the upper compartment, and a partition between said lamps isolating said lamps for other illuminating purposes, said partition having a horizontal portion between the upper and lower compartments and a triangular portion extending into the lower compartment.

In testimony whereof I affix my signature in presence of two witnesses.

FERDINAND C. ROBERTS.

Witnesses:
ANNA M. DORR,
KARL H. BUTLER.